Nov. 13, 1951 V. L. DU BOIS 2,574,914
ROTARY TABLE

Filed April 18, 1946 3 Sheets—Sheet 1

Virgil L. DuBois
INVENTOR

BY
Philip A. H. Terrell
ATTORNEY

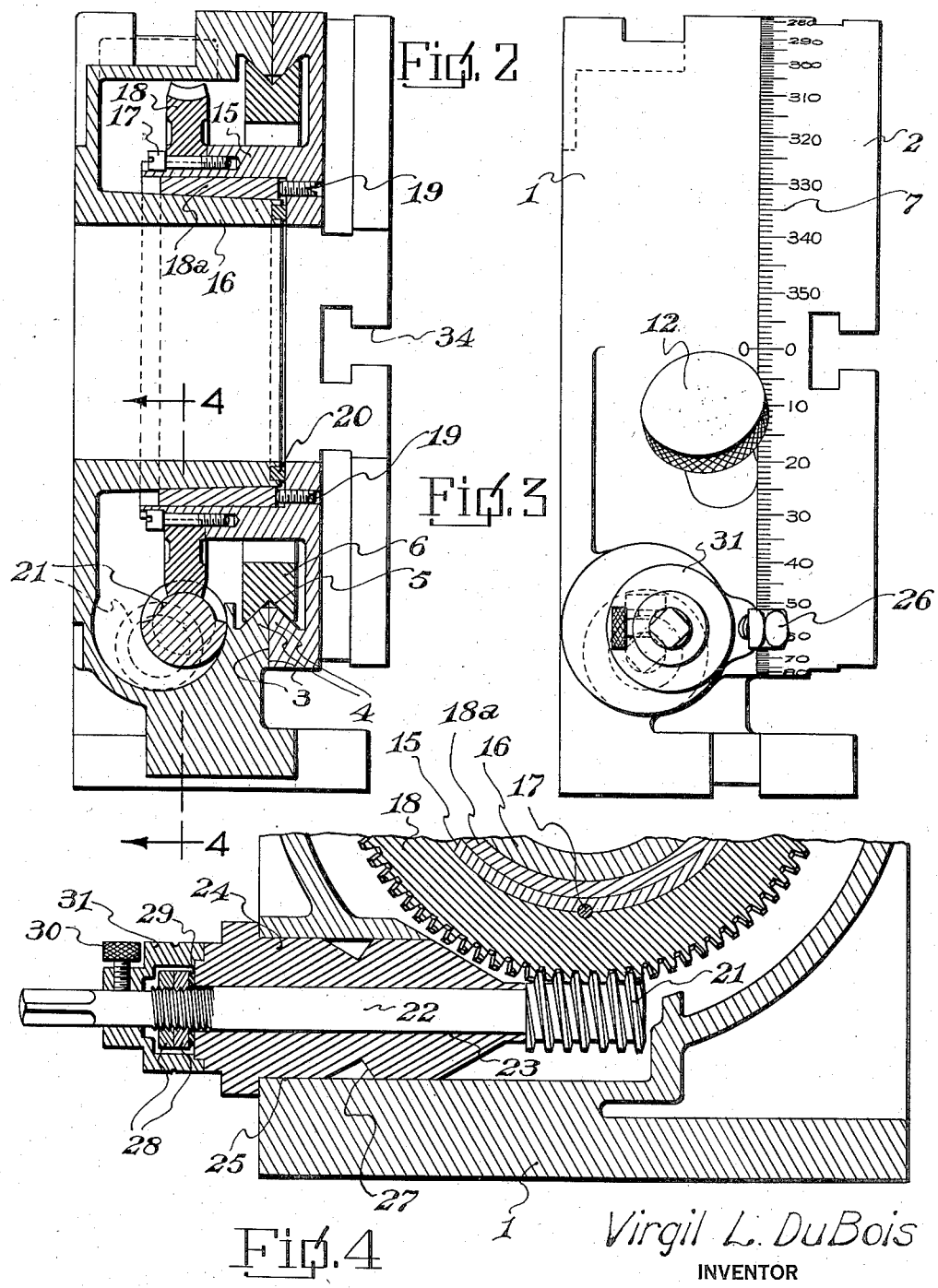

Nov. 13, 1951  V. L. DU BOIS  2,574,914
ROTARY TABLE

Filed April 18, 1946  3 Sheets-Sheet 3

Virgil L. Du Bois
INVENTOR

ATTORNEY

Patented Nov. 13, 1951

2,574,914

UNITED STATES PATENT OFFICE 2,574,914

ROTARY TABLE

Virgil L. Du Bois, Tulsa, Okla.

Application April 18, 1946, Serial No. 663,208

1 Claim. (Cl. 90—59)

The invention relates to rotary indexing tables for milling machines, shapers, grinders, and the like; and has for its object to provide a device of this kind which may be secured on the machine table so that the axis of the rotary table may be in a vertical or horizontal position, according to the nature of the work to be done.

A further object is to provide a rotary table comprising a stationary base having a rotary head thereon, and a head provided with an inwardly extending annular flange within the base, and provided with a worm gear actuated by a worm for rotating the head in relation to the base to various degrees. Also to mount the worm shaft in an eccentrically mounted bearing so that the worm can be easily and quickly moved out of and into mesh with the worm gear, thereby allowing the rotary head to be quickly rotated without the aid of the worm, and then using the worm to accurately position the work to various degrees.

A further object is to provide the rotary head and stationary base with registering engaging inwardly V-shaped annular flanges which flanges are received in a V-shaped groove in the outer periphery of an expansible locking ring so the rotating head may be easily and quickly unlocked, then locked, after it is adjusted to the proper degree.

A further object is to provide a tapered bearing sleeve interposed between a tapered bearing surface of the stationary base and the rotatable head, and means for adjusting said tapered bearing sleeve for taking up wear thereon.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a vertical longitudinal sectional view through the rotatable table.

Figure 3 is a side elevation of the table.

Figure 4 is a vertical transverse sectional view through the lower portion of the table, taken on line 4—4 of Figure 2.

Figure 1:
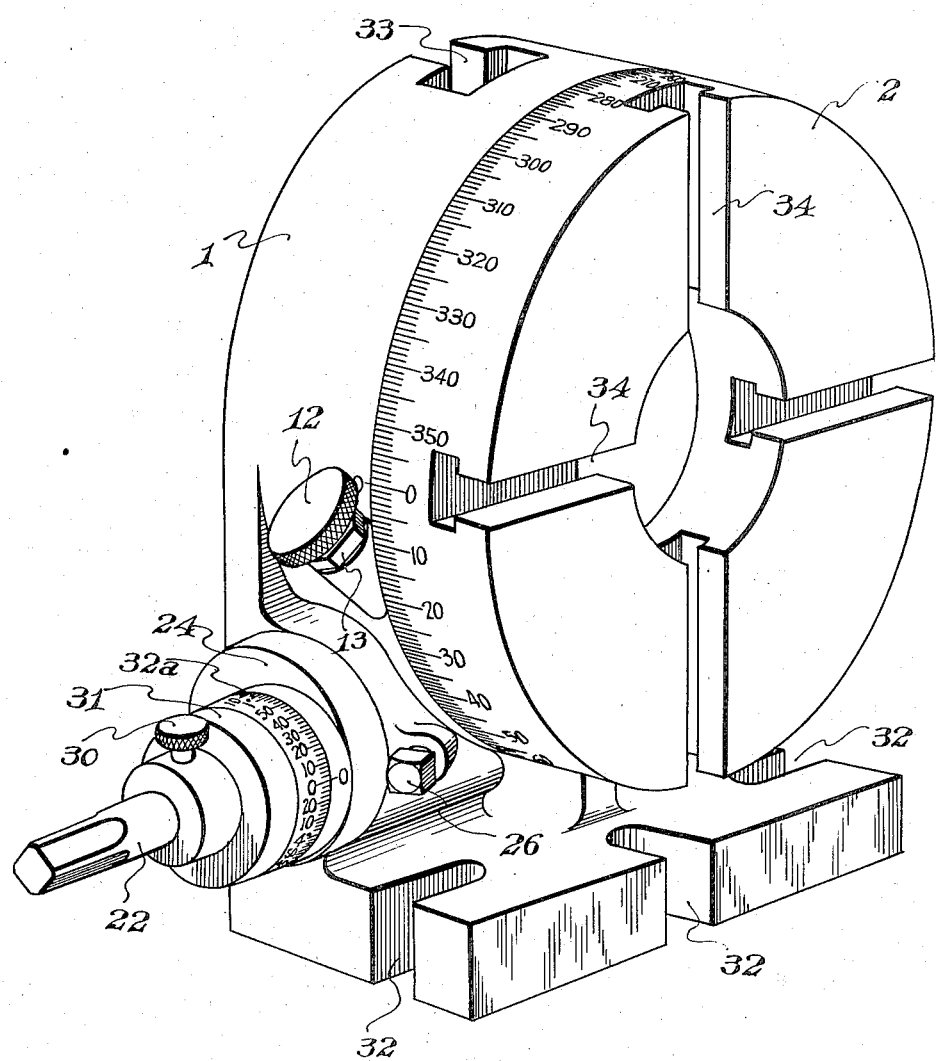
Figure 1 is a perspective view of the rotatable table.

Referring to the drawings, the numeral 1 designates the stationary base of the table and 2 the rotatable head carried thereby. The adjacent faces 3 of the base and head have a ground engagement, and are provided with registering engaging V-shaped annular flanges 4 extending into the V-shaped annular channel 5 of the expansible locking ring 6, which ring is adapted to lock the head against rotation on the base after the head has been properly adjusted according to the degree scale 7 on the head. The expansible ring 6 is formed from segments 8, the adjacent ends of which are provided with rock joints 9, so that when the ring is expanded there will be a positive uniform engagement of the ring with the registering flanges 4.

Figure 5:
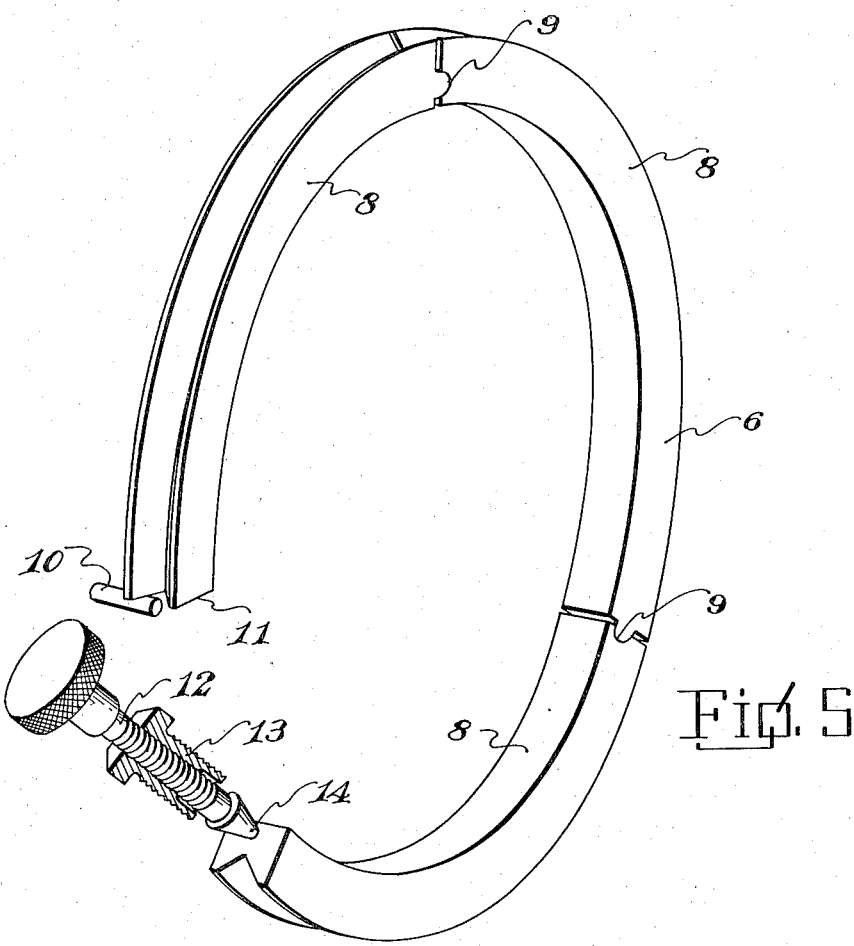
Figure 5 is a perspective view of the segmental locking ring.
Figure 6:
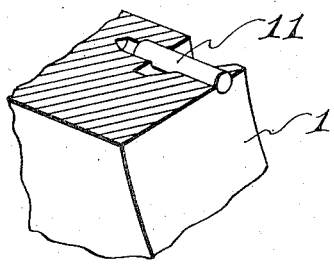
Figure 6 is a detail perspective view of a portion of the base, showing the transverse stop pin for engaging one end of the expansible ring during the locking operation.

Extending through the annular flange 4, carried by the base 1 is a transverse stop pin 10 engaged by the end 11 of the expansible ring, for holding that end against circumferential movement during the expanding operation. The ring is expanded by an inwardly and downwardly inclined adjusting screw 12, threaded through an adjusting bushing 13, threaded into the base 1. The nose 14 of the adjusting screw 12 engages the end of the expansion ring as shown in Figure 5, hence it will be seen that the locking ring may be easily and quickly expanded for holding the rotary head 2 against rotation, in relation to the base, and quickly released to allow a free rotation of the head, either by an operating screw, hereinafter set forth, or manually for a quick adjustment, when the operating screw is in inoperative position.

The rotating head 2 is provided with an inwardly extending annular flange 15 surrounding a tapered annular flange 16 within and forming a part of the head 1, and on the flange 15 is locked, by anchor screws 17, a worm gear 18, utilized for the rotatable adjustment of the head. Interposed between the flanges 15 and 16 is a tapered sleeve 18ᵃ forming a bearing between the parts and sleeve 18ᵃ is adjusted inwardly from time to time by adjusting screws 19 for taking up the wear on the parts, incident to use. A dust and oil ring 20 is interposed between the parts for excluding foreign matter.

Worm gear 18 is rotated by a worm 21 which meshes with the underside of the worm gear and is carried by a rotatable shaft 22. The rotatable shaft 22 is rotated in a bearing 23 in an eccentric position in the rotatable adjusting member 24, mounted in a bearing 25 in the base adjacent its lower side. The bearing member 24 is held in various rotated positions by a set screw 26 which extends inwardly and cooperates with an annular V-shaped channel 27 in the outer periphery of the bearing member 24. It will be seen that by rotating the bearing member 24 clockwise that the worm 21 can be moved downwardly and outwardly in the dotted line position shown in Figure 2, and out of driving engagement with the worm gear 18, and under which conditions the expansion ring screw 12 may be loosened and the rotatable head may be manually rotated for quick adjustment to any degree desired, and after which the parts are locked together by the expansion ring and the rotatable bearing member 14 can be again rotated anti-clockwise for again engaging the worm 21 and the worm gear 18.

The outer end of the shaft 22 is provided with adjusting nuts 28, which act against a washer 29, and by means of which the worm shaft 22 can be axially adjusted to reduce the end play, caused by wear. Also mounted on the outer end of shaft 22, by means of a set screw 30, is a calibration collar 31 having calibrations 32a thereon, which have a relation to the scale or calibrations 7 on the rotating head. The worm is preferably of the single lead type, and the worm gear provided with eighty teeth, therefore it takes eighty revolutions of the worm to make the head revolve once. On this basis one complete revolution of the worm will rotate the head four and one half degrees. Eighty teeth into three hundred and sixty degrees equal four and one half degrees for each tooth, therefore the calibration collar 31 is cut into four and one half degrees, with divisions between each degree representing two and one half minutes. By turning the worm shaft one graduation of the collar would represent two and one half minutes turn of the head. In other words, if the collar is turned from zero to ten, the head would have rotated ten minutes or one sixth of one degree. This particular arrangement makes for very accurate manipulation and easy control. Although particular degrees and proportions are set forth, it is to be understood that applicant does not limit himself in this particular.

When the axis of the device is used in a horizontal position it is held on the machine table by headed bolts extending through slots 32 in the lower end of the stationary base 1. When it is desired to place the device on the machine table with its axis vertical, the base 1 is placed on the table on its back, and headed bolts are passed through the T-slot 33 in the back of the base. The outer face of the rotatable head is provided with the usual radial T-slots 34 for clamping work in the device.

From the above it will be seen that a rotating table is provided for metal working machinery, which is simple in construction, and one whereby a microscopic adjustment may be easily and quickly obtained, either through the adjusting screw or manually and that all the parts can be quickly locked in adjusted position by the expansible locking ring.

The invention having been set forth what is claimed as new and useful is:

A rotary table for metal working machines, said table comprising a base adapted to be secured to a metal working machine table, a rotating head carried by said base, means within the base for rotating the head, engaging flanges carried by the head and base, an expansion member within the head and base and cooperating with the engaging flanges of the head and base for locking the head and base together said expansion member being formed from a plurality of arcuate members circumferentially arranged and having V-shaped grooves in their outer faces, adjacent ends of two of said arcuate members being spaced apart, a stop carried by the engaging flanges and engaging one of said adjacent ends, a substantially tangential adjusting and expanding screw cooperating with the other adjacent ends and forming means for expanding said expansion member, said adjacent engaging ends of the arcuate members forming the expansion member being rockably engaged for independent movement in the plane of the expansible member, said rockable engagement comprising transverse ribs carried by ends of the arcuate members and rockable in transverse grooves carried by the ends of adjacent members.

VIRGIL L. DU BOIS.

REFERENCES CITED

The following references are of record in the file of this patent:

UNITED STATES PATENTS

| Number | Name | Date |
|---|---|---|
| 1,047,270 | Miller | Dec. 17, 1912 |
| 1,446,829 | Burrell et al. | Feb. 27, 1923 |
| 1,934,358 | Kylin | Nov. 7, 1933 |
| 2,059,753 | Scott et al. | Nov. 3, 1936 |
| 2,170,888 | Abel | Aug. 29, 1939 |
| 2,364,478 | Schreiber | Dec. 5, 1944 |